United States Patent [19]

Hora et al.

[11] Patent Number: 5,242,265

[45] Date of Patent: Sep. 7, 1993

[54] AIRCRAFT PITCH CHANGE MECHANISM

[75] Inventors: Petr Hora, West Chester; Thomas C. Hermans; David E. Bulman, both of Cincinnati; Edwin K. Miller, West Chester, all of Ohio; Thomas G. Wakeman, Lawrenceburg, Ind.; David L. Joyce, West Chester, Ohio

[73] Assignee: General Electric Company, Cincinnati, Ohio

[21] Appl. No.: 556,242

[22] Filed: Jul. 23, 1990

[51] Int. Cl.$^5$ ................. B64C 11/32; B64C 11/48
[52] U.S. Cl. ........................ 416/26; 416/46; 416/129; 416/130; 416/153; 416/160; 416/162
[58] Field of Search .......... 416/26, 32, 46, 128, 416/129, 130, 152, 160, 162, 170 R, 169 R, 153

[56] References Cited

U.S. PATENT DOCUMENTS

| | | | |
|---|---|---|---|
| 2,108,660 | 2/1938 | Farrell | 416/152 |
| 2,127,687 | 8/1938 | Heath | 416/160 |
| 2,541,636 | 2/1951 | Chillson . | |
| 2,592,124 | 4/1952 | Diefenderfer | 416/46 |
| 2,664,960 | 1/1954 | Longfellow . | |
| 3,536,415 | 10/1970 | Kusiak . | |
| 3,647,320 | 3/1972 | Chilman . | |
| 3,672,788 | 6/1972 | Ellinger . | |
| 3,866,415 | 2/1975 | Ciokajlo . | |
| 3,893,789 | 7/1975 | Andrews . | |
| 3,910,721 | 10/1975 | McMurtry . | |
| 3,912,418 | 10/1975 | Andrews et al. . | |
| 3,922,852 | 12/1975 | Drabek . | |
| 3,964,839 | 6/1976 | Kusiak . | |
| 3,994,128 | 11/1976 | Griswold, Jr. . | |
| 4,047,842 | 9/1977 | Avena et al. . | |
| 4,376,614 | 3/1983 | Woodruff | 416/32 |
| 4,521,158 | 6/1985 | Fickelscher . | |
| 4,534,524 | 8/1985 | Aldrich . | |
| 4,657,484 | 4/1987 | Wakeman et al. . | |
| 4,660,437 | 4/1987 | Scott . | |
| 4,692,093 | 9/1987 | Safarik | 416/152 |
| 4,738,589 | 4/1988 | Wright | 416/129 |
| 4,738,590 | 4/1988 | Butler . | |
| 4,738,591 | 4/1988 | Butler . | |
| 4,750,862 | 6/1988 | Barnes et al. . | |
| 4,936,746 | 6/1990 | Mayo et al. | 416/46 |

FOREIGN PATENT DOCUMENTS

| | | |
|---|---|---|
| 58-197499 | 11/1983 | Japan . |
| 531756 | 1/1941 | United Kingdom . |
| 1296063 | 11/1972 | United Kingdom . |
| 2182397 | 5/1987 | United Kingdom . |

OTHER PUBLICATIONS

Article–"A New Design for a Contra-Prop"14 Aeronautical Engineering.

Primary Examiner—Edward K. Look
Assistant Examiner—James A. Larson
Attorney, Agent, or Firm—Jerome C. Squillaro; John R. Rafter

[57] ABSTRACT

A system for changing pitch in aircraft propfans is disclosed, in which a motor, located at a stationary position, changes pitch of the blades by of a gear train. Three features of the system are that a feather brake can override the motor and drive the blades toward feather; a unison brake can prevent pitch from undergoing excursions toward fine pitch when propeller speed exceeds a limit; and the motor is non-rotating in the absence of pitch change. A pair of such systems can be used in a counterrotating propfan system, in order to independently change pitch of the propfans.

16 Claims, 12 Drawing Sheets

1

AIRCRAFT PITCH CHANGE MECHANISM

CROSS-REFERENCE TO RELATED APPLICATIONS

This application is related to co-pending U.S. patent application Ser. No. 07/550,009, filed Jul. 9, 1990, for a PROP-FAN PITCH-CHANGE MECHANISM, U.S. patent application Ser. No. 07/556,155, filed Jul. 23, 1990, for PITCH CHANGE MECHANISM FOR PROP FANS, and U.S. patent application Ser. No. 07/556,145, filed Jul. 23, 1990, for PITCH CHANGE MECHANISM.

The invention relates to pitch change systems for aircraft propellers and, more particularly, to such systems for use with counter rotating propellers of the prop fan type.

BACKGROUND OF THE INVENTION

FIG. 1 illustrates an aircraft 3 powered by counter rotating propellers 6 and 9. The propellers rotate in opposite directions as indicated by arrows 12 and 15. FIG. 2 illustrates schematically a type of turbine system which can be used to drive the propellers 6 and 9.

In FIG. 2, fore propeller 6 is attached to a first turbine 18 which is supported by bearings 21A and 21B and rotates in direction 12 indicated in FIG. 1. The components rotating in this direction are decorated with hatching in FIG. 2. The aft propeller blade 9 is fastened to a second turbine 24 which is supported by bearings 27A and 27B and rotates in direction 15 of FIG. 1. A hot, high energy gas stream 30 provided by a gas generator (not shown) causes rotation of the turbines.

Propellers 6 and 9 (which are sometimes called fans or propfans in the art) are of the variable pitch type. Variable pitch means that each blade can rotate about a respective pitch axis 6A or 9A in FIGS. 1 and 2 as indicated by circular arrows 33 and 36. A principal reason for changing pitch is to provide the blades 6 and 9 with the angle of attack which is proper for the present air speed of the aircraft and power level of the engine.

In the configuration of FIG. 2, it is important that the motor 38, which is used to cause the pitch change, should be located near the aft end of the turbines, as shown. Such location provides convenient access for maintenance personnel. The motor drives a shaft 49 which drives a gear 45 which changes pitch.

However, with such a motor location, the frame 40 of the aft turbine 24 acts as a rotating obstacle which the power driving shaft 49 must cross, as indicated by phantom shaft path 42. Restated, a shaft occupying path 42 will prevent relative rotation of the turbines 18 and 24.

One approach to crossing this obstacle is given in U.S. Pat. No. 4,657,484, by Wakeman et al., entitled "Blade Pitch Varying Means," of which the General Electric Company is the Assignee, and which is hereby incorporated by reference. Part of this patent is shown in simplified form in FIG. 3. The crossing mentioned above is accomplished by push rod 93, as will be shortly discussed.

In FIG. 3, pitch change is caused by two gear racks 84 and 86 which drive two pinions 82 and 68. The racks 84 and 86 slide left- and rightward on rails 58, 74, and 78. Rail 74 rides on carriage 59, which rides on rail 58. Rail 58 is supported by stationary frame 305, and does not move. However, rail 78 is supported by turbine 18, and rotates along with that turbine.

Rack 86 is driven as follows. A hydraulic piston 50 drives a rod 52 which moves a first inner bearing race 56 left- and rightward, and which pulls a first outer bearing race 60 in the same direction, because of balls 62 located between the races. The balls perform two functions: (1) they pull the outer race 60 along with the inner race 56, thereby forcing the outer race 60 to remain adjacent the inner race 56, and (2) the balls also allow the outer race 60 to rotate about axis 67, while the inner race 56 remains stationary.

The outer race 60 moves the rack 86 left- and rightward and this motion rotates the pinion 68, which rotates a shaft 109, which rotates aft propeller blade 9 in order to change pitch, as indicated by arrow 70. A second hydraulic piston 50A drives a second push rod 52A which moves a second inner bearing race 94 left- and rightward. The second inner bearing race 94 pulls a second outer bearing race 92 in the same direction. The second outer race 92 moves a second rod 93 left- and rightward. The second rod 93 connects to a third inner race 96, the left- and rightward motion of which drives the second rack 84 left- and rightward through a third outer race 98, in order to change pitch of the fore blade 6.

Second outer race 92 and third inner race 96 are supported by turbine 24, as is second rod 93, and the three components rotate about axis 67. However, the third outer race 98 is carried by turbine 18, as is rack 84 and pinion 82, and these three components rotate along with turbine 18, in the opposite direction.

That is, third races 96 and 98 form a differential bearing: both races rotate in opposite directions. Such is not the case with races 92 and 94, nor with races 56 and 60.

Therefore, axial (ie, left- and rightward) motion of the piston rods 52 and 52A cause pitch change of respective blades 6 and 9, even though turbine 18 is nested within turbine 24. (The former turbine 18 is supported on bearings 321 and 324, while the latter turbine 24 is supported on bearings 308 and 311, and both turbines rotate in opposite directions.)

Five significant features of the arrangement of FIG. 3 are the following. One, as described, the pitches of blades 6 and 9 are independently adjustable. However, there is not true independence of pitch: for reasons which need not be understood by the reader, the system of FIG. 3 requires that the pitches of blades 6 and 9 remain within about 8 degrees of each other. Under some flight conditions, such as during reverse thrust applied after touch-down during landing, it can be required that the pitches of blades 6 and 9 differ by 8 degrees or more.

Two, there is a reversing axial load applied to the bearings associated, for example, with races 96 and 98. This reversing load is not desirable.

Three, the train of components located between the pistons 52 and 52A and the respective blades 6 and 9 possess a certain springiness, which is undesirable. That is, the system is not stiff.

Four, for reasons which need not be understood by the reader, the system of FIG. 3 was found to impose an undesirable travel limit on the total pitch excursion from the deepest negative pitch to the highest positive pitch.

Five, high dynamic loads were found to be imposed on the differential bearing comprising races 96 and 98.

OBJECTS OF THE INVENTION

It is an object of the invention to provide an improved pitch change mechanism for aircraft.

It is a further object of the invention to provide a pitch change mechanism having improved stiffness.

SUMMARY OF THE INVENTION

In one form of the invention, a pitch-change system changes pitch of an aircraft propeller. In addition, a feather brake can override the pitch-change system and drive the blades toward feather, if a malfunction should occur. Feathering the blades causes the propeller to slow and stop. Further, a unison brake can override the pitch-change system and prevent excursions of the blades toward fine pitch, yet still allow excursions toward feathered pitch.

BRIEF DESCRIPTION OF THE DRAWINGS

FIG. 6 contains many of the components of FIG. 5.

DETAILED DESCRIPTION OF THE INVENTION

Simplified Form of Invention

Figure 4:
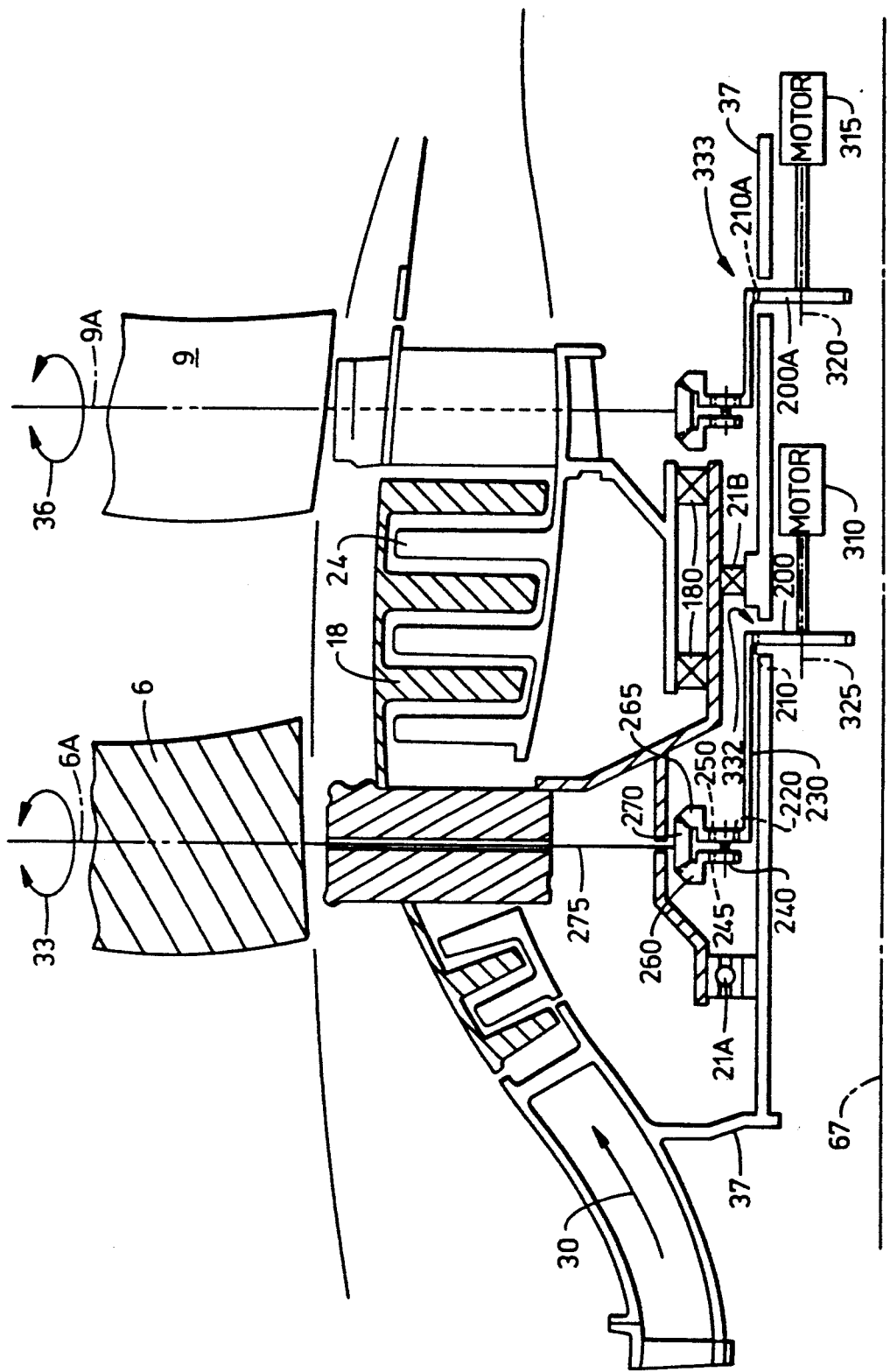
FIG. 4 is a simplified illustration of one form of the invention.

FIG. 4 illustrates a simplified view of one form of the invention. A stationary frame 37 carries a first rotor 18 (shown hatched) by means of bearings 21A and 21B. A first pinion gear 200 drives an internal ring gear 210 which connects to a sun gear 220 by a cylindrical shell 230. Sun gear 220 drives a compound planet gear 240, which drives ring gears 245 and 250.

The gear ratios between ring gears 245 and 250 and their respective sub-planets of planet 240 are different. Consequently, the rotation of sun gear 220, which causes rotation and orbiting of planet gear 240, causes ring gears 245 and 250 to rotate in opposite relative directions about turbine axis 67. A more detailed explanation of the mechanism of this opposite rotation caused by motion of planet 240 is given at the end of the Specification, in the section entitled "Technical Considerations."

The ring gears 245 and 250 are connected to respective bevel ring gears 260 and 265 which both drive a common bevel gear 270. The common bevel gear 270 drives a quill shaft 275 which leads to blade 6. Rotation of the quill shaft 275 changes pitch of the blade as indicated by arrow 33. In another form of the invention, a planetary reduction gear (later described) is connected between the quill shaft and the blade, in order to give the quill shaft a torque advantage over the blade.

A second rotor 24 is carried by bearings 180, which are carried by the first rotor 18. The second rotor rotates in the opposite direction to the first rotor. An identical gear train to that just described for the first rotor changes pitch of the aft propeller blade 9.

Three important features of the invention of FIG. 4 are the following. First, the pitches of the blades 6 and 9 are independently controllable. That is, pinion gears 200 and 200A are driven by separate motors 310 and 315, in order to separately control the pitches of blades 6 and 9.

Second, both pinions 200A and 200 rotate about their own respective axes 320 and 325, but are stationary in space. That is, the axes themselves do not orbit about centerline 67. Consequently, the pinions can be located at respective windows 333 and 332 in stationary frame 37. The windows are fixed in space and non-rotating. This stationary feature of pinions 200 and 200A can be contrasted with the non-stationary planet 240, which rotates about its own axis 240D, which is shown in FIG. 6, while also orbiting about the axis of rotation 67 of the rotor 18.

Third, during normal operation of the propeller system, ring gears 210 and 210A are continuously rotating at synchronous speed (in the absence of pitch change) with their respective rotors 18 and 24. Consequently, pinions 200 and 200A are also continuously rotating. In order to accomplish a pitch change of blade 6, ring gear 210 must accelerate or decelerate with respect to rotor 18 for a brief period of time, causing pitch change during the acceleration or deceleration.

More Complex Form of the Invention

Figure 5:
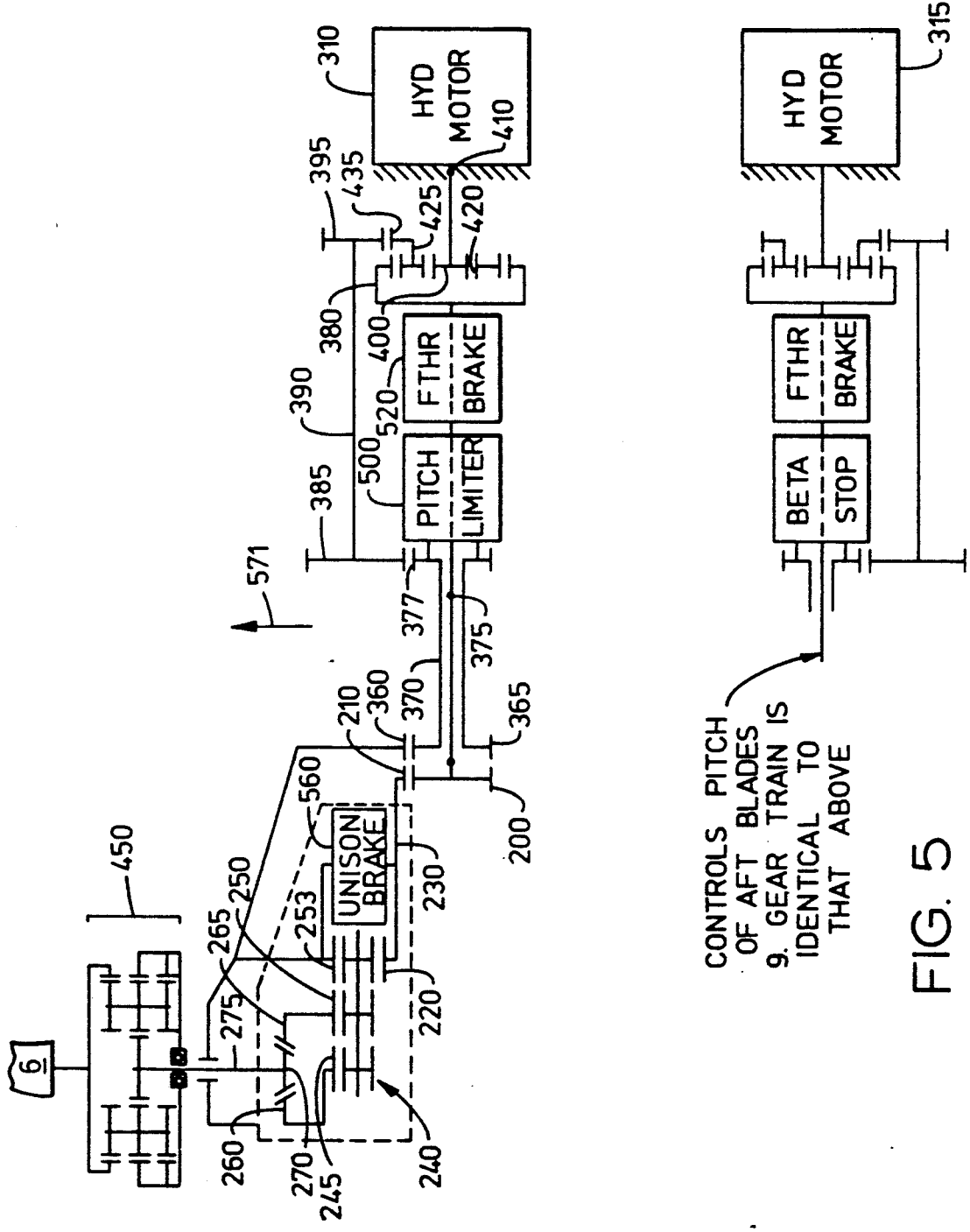
FIG. 5 is a schematic of one form of the invention.
Figure 6:
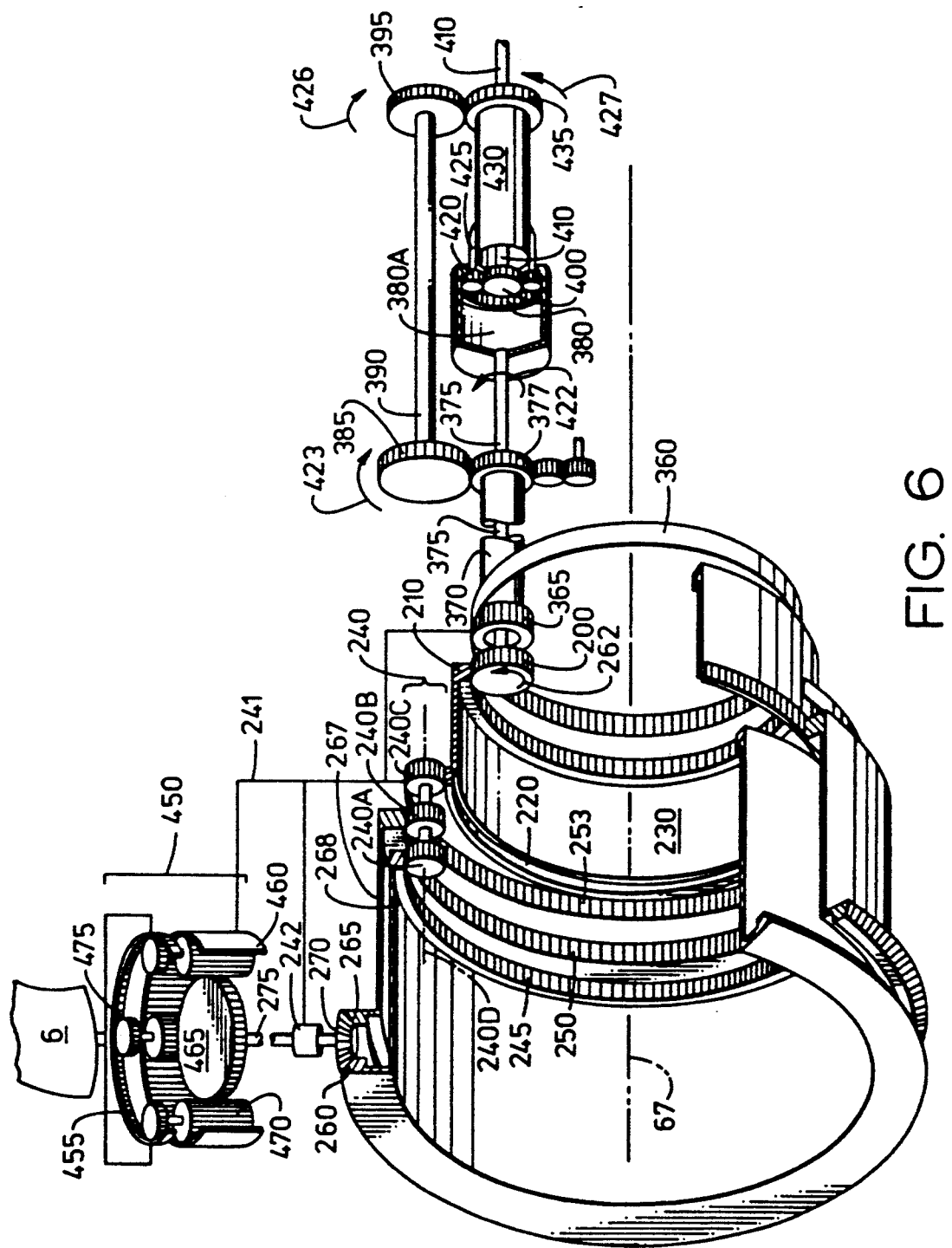
FIG. 6 is a perspective schematic view of one form of the invention.
Figure 7:
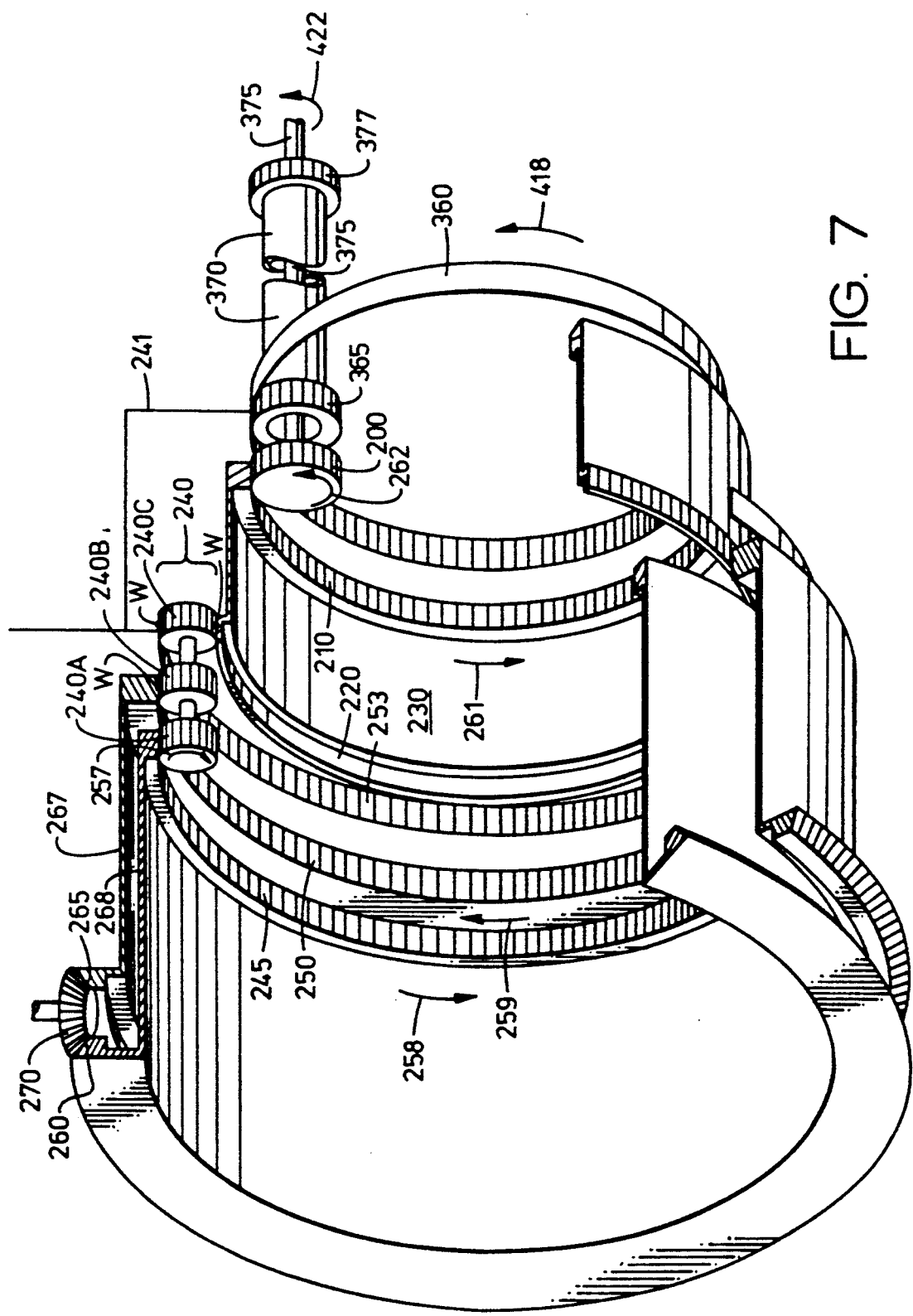
FIGS. 7 and 8 show detailed views of parts of FIG. 6.
Figure 8:
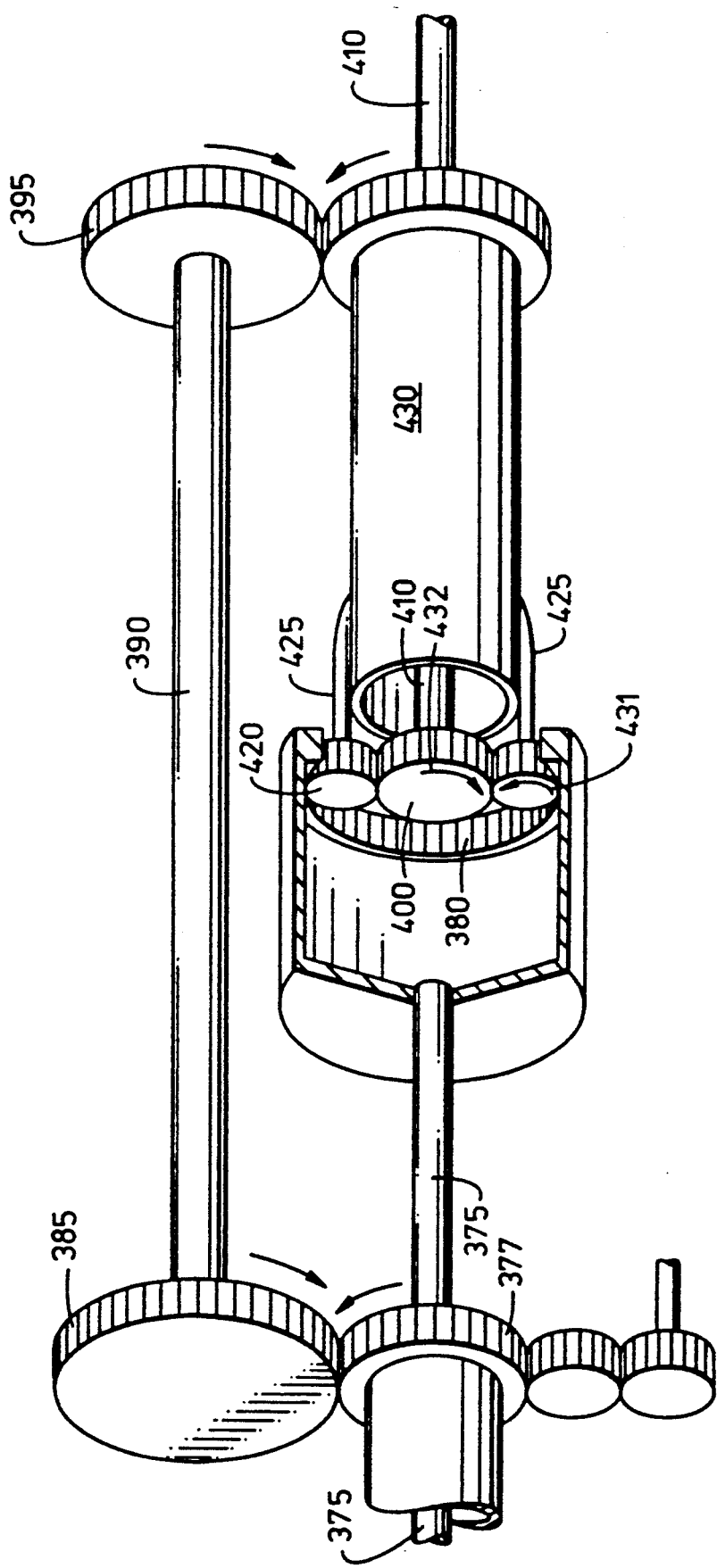
Figure 9:
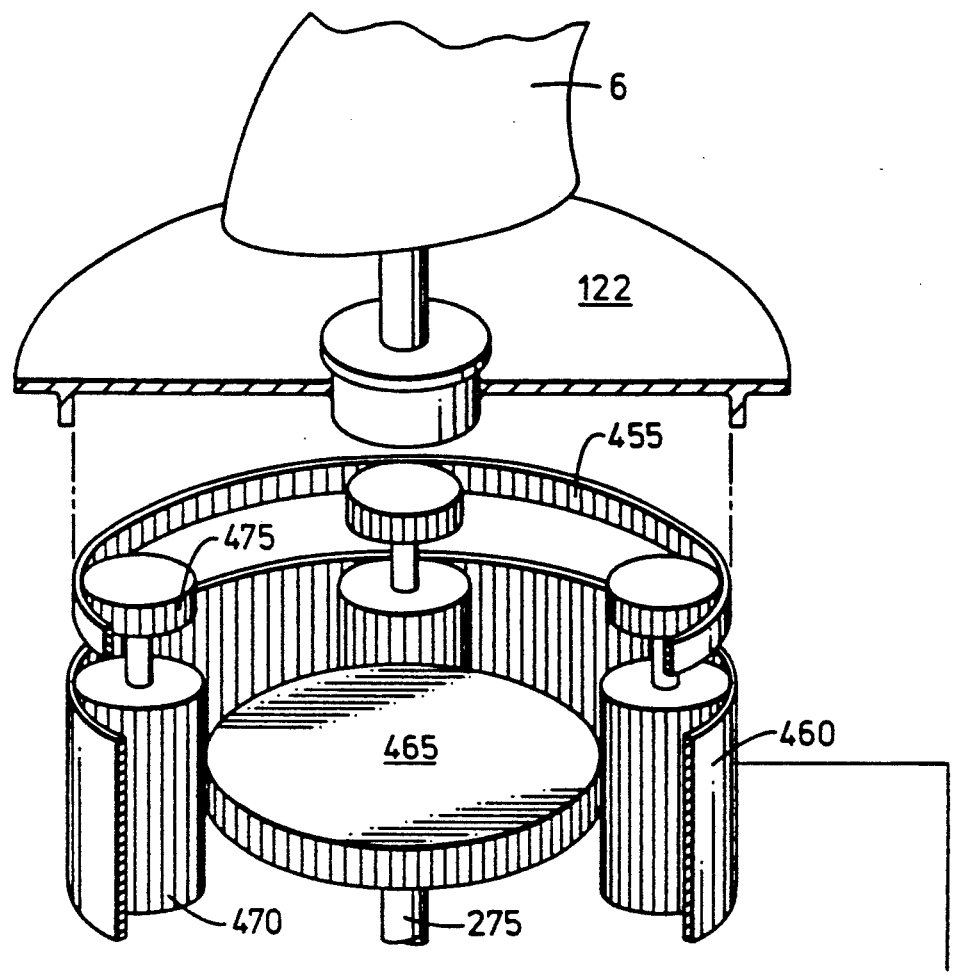
FIG. 9 is a simplified view of FIG. 5B.

FIG. 5 shows another form of the invention, part of which is shown in schematic perspective view in FIG. 6, and in greater detail in FIGS. 7-9. In FIGS. 6-9, identical parts have identical numbers.

Figure 5A:
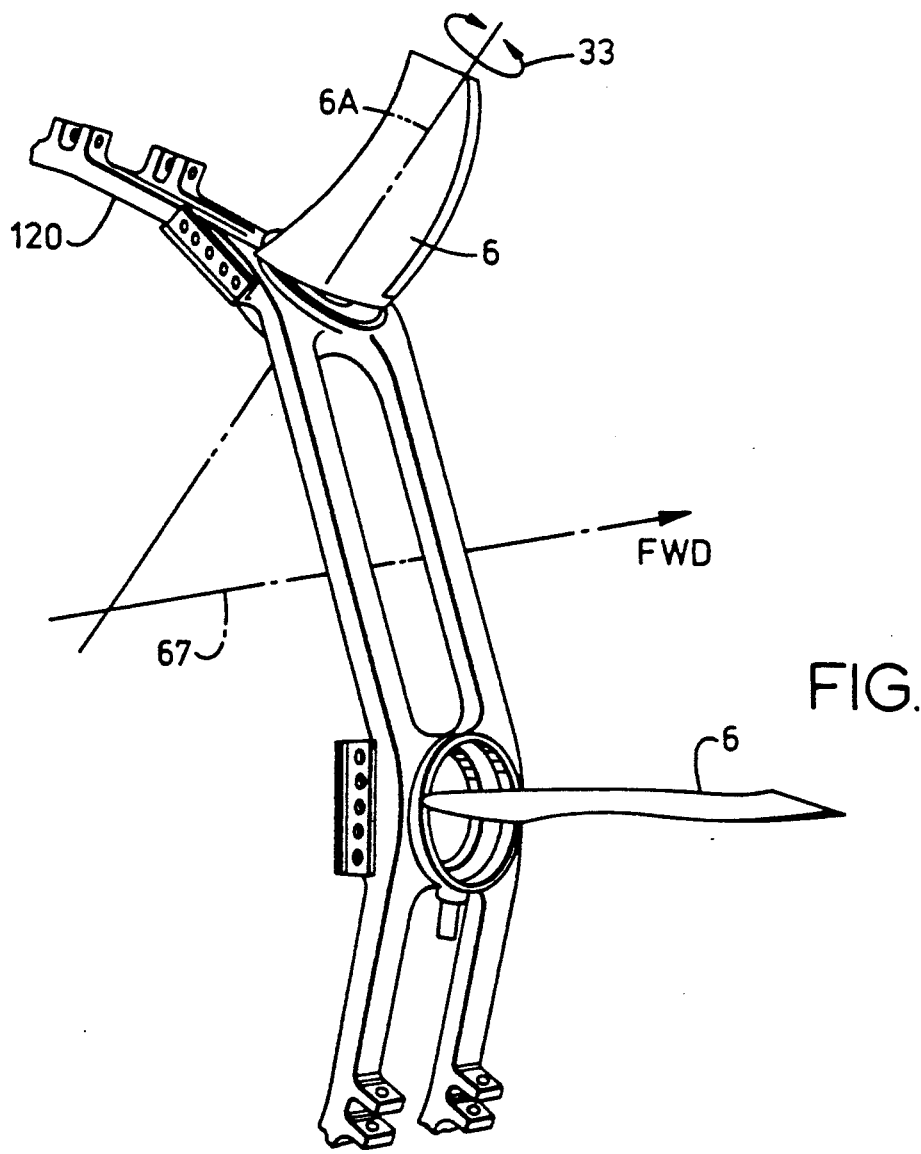
FIG. 5A illustrates an annular carrier which can carry the blades of FIG. 2, 3, and 4.
Figure 5B:
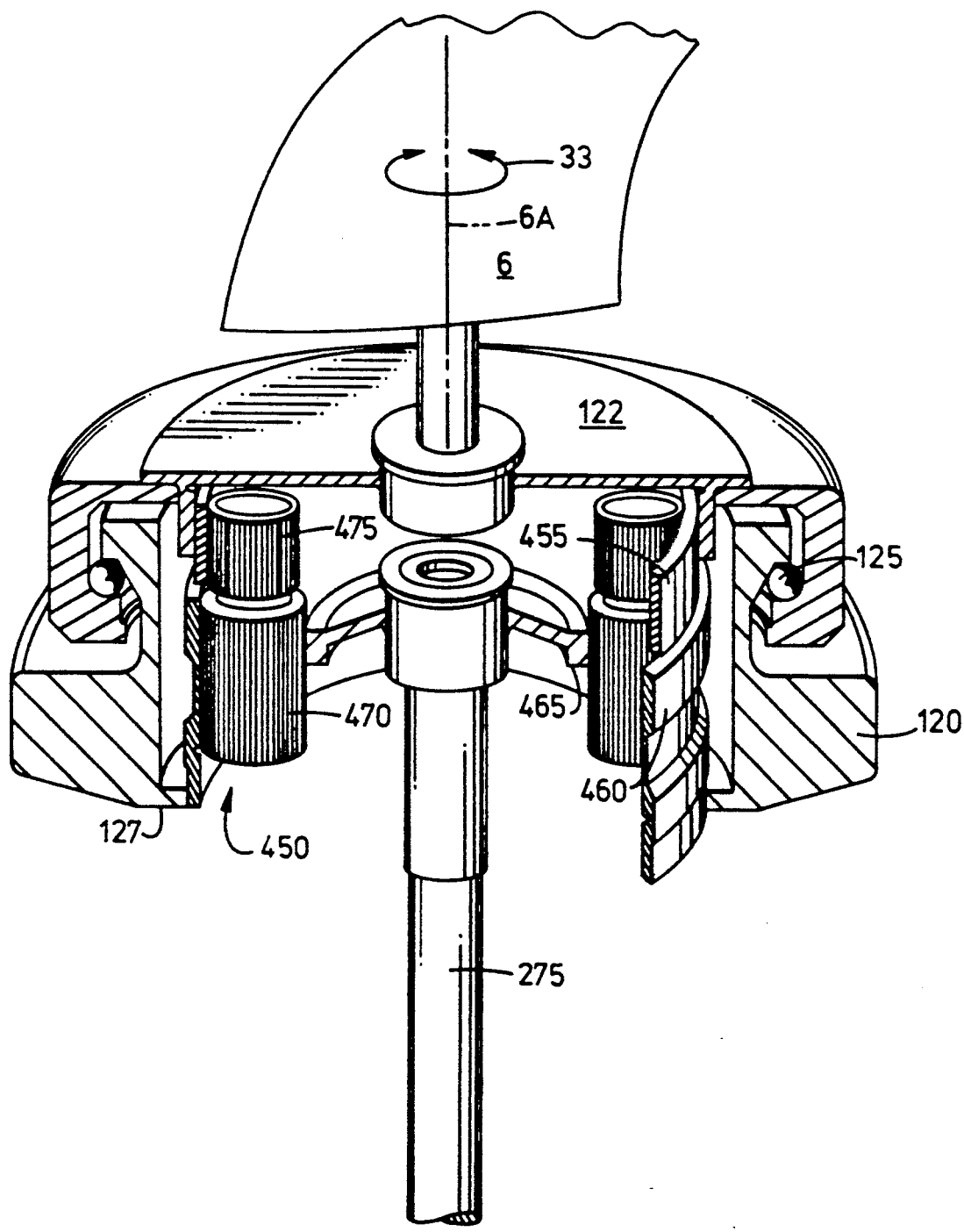
FIG. 5B is an enlarged view of a torque multiplier 410 in FIG. 5.

The blades 6 are carried by an annular carrier taking the form of a polygonal ring 120 in FIG. 5A. FIG. 5B shows one type of mounting system for mounting the blades to the ring. Each blade 6 is carried by a trunnion 122 which is carried by the ring 120 by bearings 125. The bearings allow rotation of the trunnion as shown by arrows 33. A reduction gearbox 450 (termed a "hub gearbox" because it occupies a position corresponding to the hub position in a normal propeller) in FIGS. 5, 5B, 6, and 9 amplifies the torque produced by quill shaft 275.

The hub gear box 450 contains two types of ring gear. The first type 460 is affixed to the annular carrier, and does not rotate with respect to the carrier, as indicated by the connection 127 in FIG. 5B. The second type 455 is affixed to the trunnion 122, which is supported by the annular carrier 120 through the bearings 125, and is thus free to rotate about the pitch axis 6A.

Planet gears comprising sub-planets 470 and 475 engage both types of ring gear, and at different gear ratios. For the reasons discussed in "Technical Considerations," rotation of the planets causes relative rotation of the ring gears 455 and 460. A sun gear 465 causes the rotation of the planets, so that rotation of the sun gear 465 causes a change in pitch of the propeller blade 6 in FIG. 6.

The hub gear box 450 gives the sun gear 465 a mechanical advantage (about 25-to-1) over the blade 6, so that the torque carried by quill shaft 275 is significantly less than the torque needed to change pitch. Consequently, a small diameter quill shaft 275, also shown in FIG. 4, can be used. The small diameter shaft is desirable because the quill shaft must pass through the turbine flow path indicated by arrow 30 in FIG. 4. Such a small diameter quill shaft allows the shaft to be easily concealed within a turbine blade, and to cause minimal disruption of air flow within the turbine.

The hub gearbox 450 also adds stiffness to the overall system. That is, with the 25-to-1 ratio mentioned above, rotation of the quill shaft by a single degree causes the blade to rotate by only 1/25 degree: the system is stiffened, because quill shaft rotation is reduced by the gear ratio between the quill shaft and the blade. Similar considerations of stiffness enhancement apply to the components driving the quill shaft, although the 25-to-1 ratio may be different because the gear ratios may be different.

The quill shaft 275 in FIG. 6 bears a blade bevel gear 270, also shown in FIG. 7. In FIG. 7, the blade bevel gear is driven by annular bevel gears 260 and 265. The annular bevel gears are connected by cylindrical shells 267 and 268 to ring gears 245 and 250. Compound planets 240 (only one is shown) drive ring gears 245 and 250 in opposite relative directions when the planets rotate. The ring gears 245 and 250 rotate in opposite relative directions because the gear ratios between each ring gear 245 and 250 and its respective subplanet 240A and 240B are different. Detailed reasons for the opposite relative rotation are given in "Technical Considerations," at the end of the Specification.

The planet 240 also engages a third ring gear 253 which is affixed to the rotor 18 in FIG. 4 as indicated by strut 241 in FIG. 6. That is, the ring gear 253 is always synchronous with rotor 18 and blade 6. As stated above, movable ring gears 245 and 250 in FIG. 7 rotate in opposite relative directions when the planet 240 rotates. For example, if the ratio between subplanet 240A and ring gear 245 is greater than the ratio between subplanet 240B and ring gear 250, the planet rotation indicated by arrow 257 causes ring gear 245 to rotate in direction 258 relative to ring gear 250 and similarly causes ring gear 250 to rotate in direction 259 relative to ring gear 245. The relative rotation indicated by these two directions 258 and 259 will be called "positive relative rotation" (PosRR). If the planet 240 rotates in the opposite direction of arrow 257, the ring gears 245 and 250 rotate opposite to respective directions 258 and 259. This latter rotation will be called "negative relative rotation" (NegRR), since it is opposite to the former "positive relative rotation." Restated, directions 258 and 259 indicate PosRR for respective ring gears 245 and 250, and the respective opposite directions indicate NegRR.

The blade bevel gear 270 rotates in one direction under posRR and in the opposite direction under negRR. Therefore, the pitch of blade 6 in FIG. 6 changes in one direction under positive relative rotation, and in the opposite direction under negative relative rotation.

Since the ratio between the bevel pinion 270 and bevel ring gear 260 is the same as that between the same bevel pinion 270 and the other bevel ring gear 265, the ring gears 245 and 250 must rotate in opposite directions, but at the same speed, relative to the frame 18.

The rotation of planet 240 is caused by rotation of sun gear 220. This latter rotation is induced by rotation of stationary pinion 200, which rotates internal ring gear 210, which connects to sun gear 220 through shell 230. An example of the operation of the apparatus just described will now be given.

Example of Operation

In operation, in the absence of pitch change, there is no rotation of blade bevel gear 270, so there is no relative rotation of bevel gears 260 and 265, nor of ring gears 245 and 250, because the latter connect to the former by respective shells 268 and 267. Consequently, ring gears 245 and 250 rotate at synchronous speed with ring gear 253. Since all three ring gears 245, 250, and 253 form a triplet rotating at synchronous speed, there is no rotation of planet 240 about its axis 240D, but planet 240 is carried along with the three ring gears and orbits about axis 67. The planet 240 may be viewed, under these circumstances, as welded to the ring gears at points W in FIG. 7.

Because the ring gear triplets rotate at synchronous speed, and planet 240 orbits at this same synchronous speed, sun gear 220 rotates at synchronous speed with the ring gear triplets, as does internal ring gear 210. Therefore, in the absence of pitch change, all of the following rotate at synchronous speed: ring gear 210, sun gear 220, the ring gear triplets, and bevel gears 260 and 265. Stationary pinion 200 rotates at a speed determined by the gear ratio between itself and internal ring gear 210.

In order to cause a pitch change, either PosRR or NegRR of respective bevel ring gears 260 and 265 must occur. To explain pitch change, for simplicity, it is now assumed that the previous synchronous rotation has stopped, that all components in FIG. 6 are non-rotating, and that pitch is constant. With this assumption, rotation of pinion 200 (whose axis is stationary) in direction 262 causes rotation 261 of ring gear 210, which rotates planet 240 in direction 257. This planet rotation causes bevel gears to move in respective relative directions 258 and 259: this planet rotation causes PosRR.

Rotation of pinion 200 opposite to direction 262 causes rotation of planet 240 opposite to direction 257, causing rotation of bevel ring gears 260 and 265 in respective directions opposite to directions 258 and 259; this latter pinion rotation causes NegRR.

Therefore, when all components are non-rotating, the direction of pitch change depends upon the direction of rotation of pinion 200. It will now be shown that, when the components are rotating, as occurs during normal operation, it becomes the relative direction of rotation of pinion 200 with respect to pinion 365 which determines direction of pitch change. That is, it will be shown that acceleration of pinion 200 (an algebraically positive speed change) causes pitch change in one direction, and deceleration of pinion 200 (an algebraically negative speed change) causes pitch change in the opposite direction.

Relative rotation of ring gear 210 with respect to ring gear 360 causes pitch change. The direction of pitch change is determined by whether the relative rotation is PosRR or NegRR. During operation of the system, these two ring gears 210 and 360 are rotating at synchronous speed. To cause PosRR of ring gear 210 with respect to ring gear 360, pinion 200 must increase in speed in the direction 262 in FIG. 7. So long as pinion 200 maintains the increased speed, PosRR occurs, and pitch changes. (As will be explained later, PosRR, as well as NegRR, can only occur for a limited time: there are limits to the maximum and minimum pitch angles which the blade 6 can attain. When the limits are reached, PosRR or NegRR, as appropriate, must terminate.) When the desired pitch is attained, pinion 200 resumes a speed at which ring gear 210 is synchronous with ring gear 360.

Similarly, for an opposite pitch change, NegRR is required, which is achieved by decreasing the speed of ring gear 210 with respect to ring gear 360. This decrease in speed is caused by a deceleration of pinion 200 in the direction opposite to 262 and maintaining the decreased speed until desired pitch is attained. Then, the speed of pinion 200 resumes that which makes ring gear 210 synchronous with ring gear 360.

The preceding discussion has shown that pinion 200 is constantly rotating during normal operation, and that acceleration of the pinion 200 causes pitch change in one direction, while deceleration causes pitch change in the opposite direction. This discussion will now consider a differential system which allows the motors in FIG. 4 to remain non-rotating (unlike pinion 200) in the absence of pitch change, when the propeller is rotating. When pitch change is desired, clockwise rotation of the motor 310 causes pitch change in one direction, and counterclockwise rotation causes pitch change in the opposite direction.

As shown in FIGS. 6 and 8, shaft 375 connects pinion 200 with an internal ring gear 380 by means of a drum 380A. A hollow shaft 370 connects pinion 365 with a feedback pinion 377. Shaft 375 extends through this hollow shaft 370. Feedback pinion 377 drives a spur gear 385 which drives spur gear 395 through shaft 390. Spur gear 395 drives spur gear 435 which drives a planet carrier 430 which carries planets 420 on axes 425. Rotation of the carrier 430 causes the planets 420 to orbit about a sun gear 400, as indicated by arrow 432, at synchronous speed with the carrier 430. However the rotational speed in direction 431 (as distinguished from orbital speed in direction 432) of planets will depend upon the ratio of sun 400 to ring gear 380, and upon the relative speeds of sun 400 and ring 380. An example will illustrate the operation of the differential of FIG. 8.

Example of Differential Operation

In the absence of pitch change, both ring gears 210 and 360 in FIG. 7 rotate in direction 418 at the same speed. Pinions 200 and 365 rotate in direction 262 at the same speed. Shaft 375 with spur gear 377 rotate in direction 422 at the same speed. Spur gear 385 in FIG. 6 rotates in direction 423, rotating spur gear 395 in direction 426, rotating spur gear 435 in direction 427. Therefore, planet carrier 430 and ring gear 380 both rotate in direction 427, and the gear ratios of the gears just described are chosen so that the sun gear 400 is stationary. Consequently, the ring gear 380 must rotate faster than the carrier 430 at a speed which can be calculated using conventional planetary differential relations. Therefore, motor 310 does not rotate during rotation of the propeller blades 6, in the absence of pitch change.

To cause a pitch change, as stated above, pinion 200 must accelerate or decelerate. Acceleration will first be explained. First, it is noted that the speed of ring gear 360 is the same as the speed of blade 6, because ring gear 360 is affixed to rotor frame 241 in FIG. 6 (which represents turbine 18 in FIG. 4) to which blade 6 is attached. Therefore, for the reasons given above, the speed of planet carrier 430 is determined by the speed of ring gear 360, and is considered constant in this example.

Assume that pinion 200 in FIGS. 6 and 7 must be accelerated in direction 262 for the desired pitch change. Assume that the system is rotating in direction 258, so that pinion 200 is already rotating in direction 262. Planet carrier 430 and ring gear 380 are rotating in direction 427 at the lower differential speeds required to keep the sun gear stationary. Rotation of sun gear 400 (which is normally non-rotating) in the direction opposite to direction 427 will cause pinion 200 to assume a higher speed, and maintain the higher speed so long as the sun gear 400 remains rotating at a given speed. When the sun gear stops, pinion 200 returns to the original speed.

Similarly, to cause an opposite pitch change to that just described, sun gear 400 (which is normally non-rotating) starts rotating in direction 427. So long as sun gear 400 is rotating, pinion 200 assumes a slower speed than pinion 365, and pitch change occurs. When sun gear 400 stops, pinion 200 assumes its original speed.

This discussion has explained how pitch change can be accomplished using a stationary, non-orbiting, non-rotating motor which rotates only when pitch change is desired, and the direction of rotation controls the direction of pitch change. The motor can be electric or hydraulic. Other features of FIG. 5 will now be considered.

Additional Features

Pitch Limiter

A pitch limiter 500 places a limit on the number of turns which pinions 200 and 365 can make with respect to each other. In placing this limit, the limiter 500 establishes the maximum and minimum pitch angles which the blade can attain, because it is relative rotation of pinions 200 and 365 which change pitch. Such limiters are known in the art.

Figure 10:
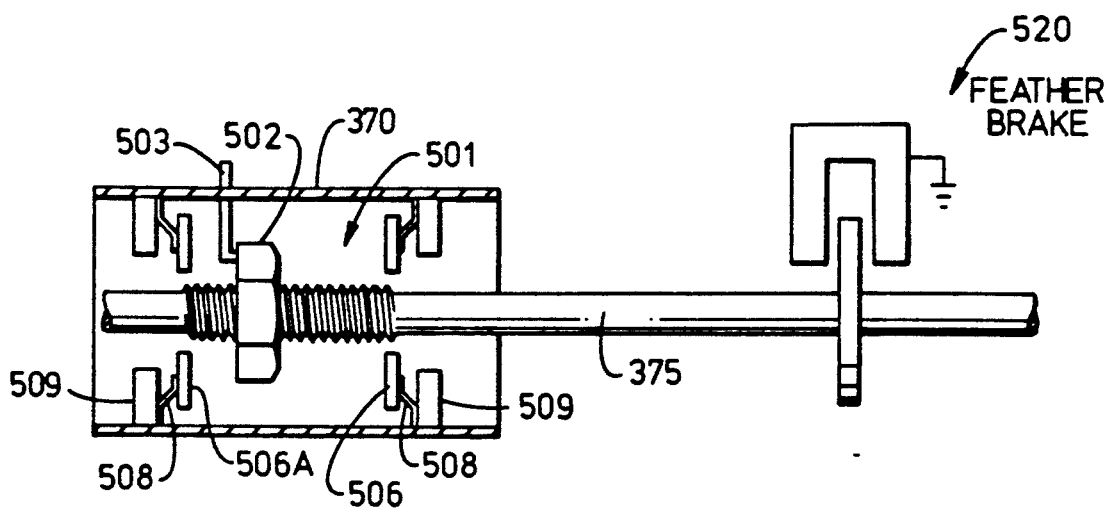
FIG. 10 illustrates, in schematic form, a pitch limiter which limits pitch in both forward and reverse operation.

The operation of one type of limiter can be explained with reference to FIG. 10, which shows shaft 375 and cylinder 370 of FIGS. 6 and 7. A threaded nut 502 rides upon a threaded section 501 of shaft 375. The nut bears a tab 503 which slides in a slot (not shown) in shell 370. The tab causes the nut 502 to maintain a constant angular position with respect to shell 370. Relative rotation between shell 370 and shaft 375 causes the nut 502 to advance either left- or rightward, and to contact brake pads 506 or 506A which are supported by springs 508 held by mounts 509. Further relative rotation is prevented by the brake pads 506, and so further pitch change is prevented. Therefore, the travel of the nut 502 is limited by the distance between brake pads 506 and 506A, which limits the relative rotation of pinions 200 and 365. The springs 508 provide a gradually increasing brake force, which prevents an abrupt locking action.

Feather Brake

A feather brake 520 in FIG. 5 is provided. The feather brake acts as a clutch, or brake, which stops rotation of shaft 375, by grounding it to the static structure. When shaft 375 stops, pinion 200 stops, which causes a pitch change. The gears are arranged so that such a stoppage causes the blade 6 to assume a feathered pitch position, rather than a fine pitch position. Feathered pitch applies a high retarding torque to the rotor 18 in FIG. 4, thereby causing rotation of the rotor 18 to slow and eventually stop. If the rotor does not stop by the time the blades reach feathered position, the blades cross the feathered position and continue to change in pitch until the stop is reached. When the rotor 18 stops, rotation of both pinions 200 and 365 stop, so that pitch becomes static.

One reason for providing the feather brake is the desirability to feather and stop the propulsor unit 18 without relying on power supplied by the aircraft or the engine. Driving the propeller blades into a feathered position accomplishes this stopping. Further, because the turbines 18 and 24 in FIG. 4 are fluidically coupled to the gas generator (not shown) which provides gas stream 30, the gas generator can continue to run after the turbines have been driven to a stop. This continued running can be desirable because the gas generator produces hydraulic, pneumatic, and electric power which are used by the aircraft to power accessories such as communications gear, control surfaces and lighting. If one of the turbine systems (18 or 24 in FIG. 4) should fail in a twin-engined plane, it can be desirable to keep the gas generator running which drives it so that the remaining engine which now provides all thrust need not, in addition, provide all power for accessories. The burden of providing the latter power is shared.

Unison Brake

A unison brake 560 in FIG. 5 is provided which can lock sun gear 220 to ring gear 253 and thus lock the pitch. The unison brake 560 is a mono-directional centrifugal brake. That is, when the sun gear 220 is driving the blade 6 into a coarser pitch position the unison brake 560 in FIG. 5 is not operational, and is invisible to the sun gear 220. The unison brake is not needed at this time because the coarser pitch of the blade 6 loads the turbine 18 and requires increased energy of gas stream 30 to maintain turbine rotation. Accidental overspeeding of the turbine 18 is not seen as a problem at this time.

However, when the blade 6 is driven toward a finer pitch position, the torque load upon rotor 18 from blade 6 becomes reduced, thus increasing the possibility of accidental rotor acceleration (if a component should fail). During this finer pitch excursion, the unison brake 560 becomes active and applies a retarding drag which sun gear 220 must overcome. The retarding drag is sufficiently large such that if, for example, shaft 375 breaks, the unison brake 560 holds the blade in its present pitch position. Without the unison brake, the breakage of shaft 375 would allow the blade 6 to assume a near-flat pitch position, because of the centrifugal twisting moment inherently present in propeller blades, and thus allow a possible runaway in speed of the turbine 18.

Figure 11:
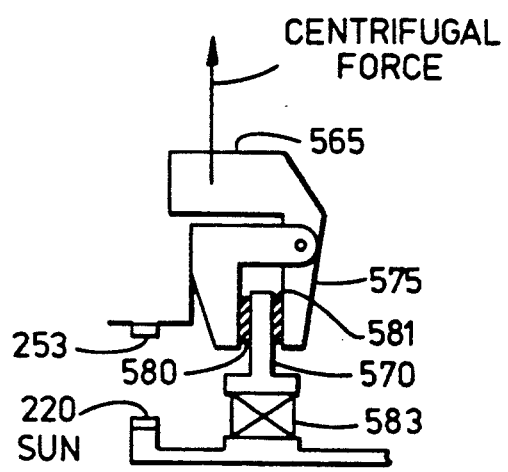
FIG. 11 illustrates a brake which locks together gears 253 and 220 in FIG. 5, when centrifugal force becomes sufficiently large.

A schematic example of a unison brake is shown in FIG. 11. Centrifugal force draws flyweight 565 outward, causing caliper 575 to squeeze disc 570 between brake shoes 580 and 581. Component 583 is an overrunning device, which acts like a ratchet and therefore includes an engagement band, as is conventional in ratchet device: disc 570 can rotate in one direction with respect to gear 220, but not in the other direction. Consequently, when the caliper 575 locks disc 570, gear 220 is not allowed to drive pitch toward a fine condition, but can drive pitch toward a coarse condition.

Advantage of Hub Gear Box 450

Figure 1:
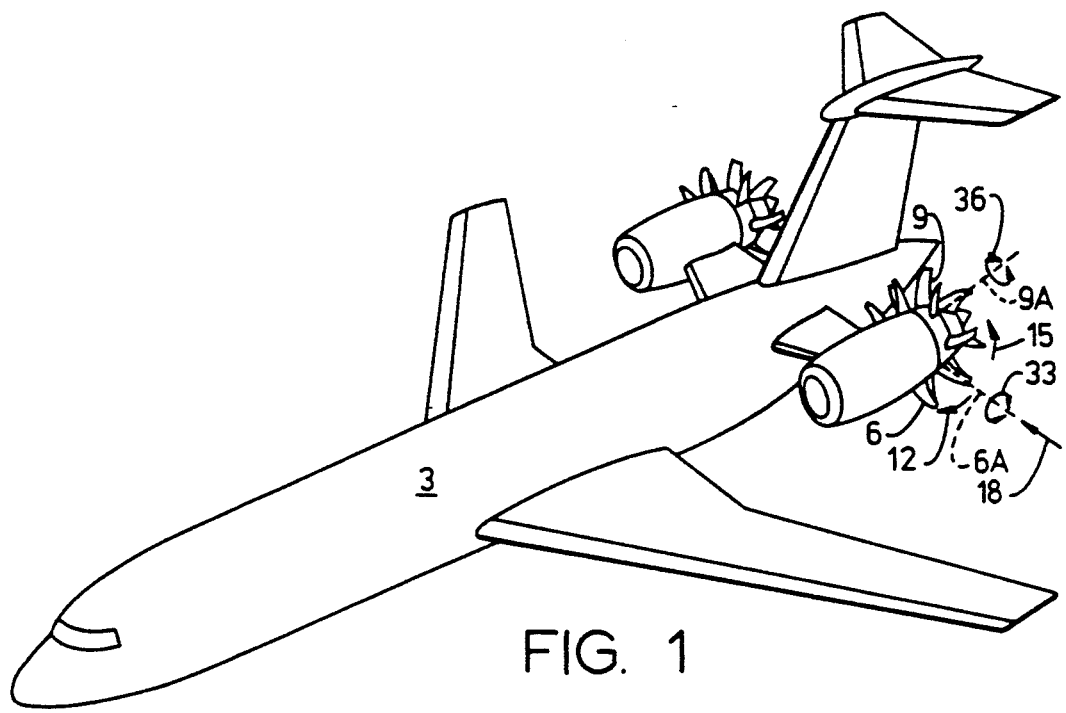
FIG. 1 illustrates an aircraft with which the invention can be used.
Figure 2:
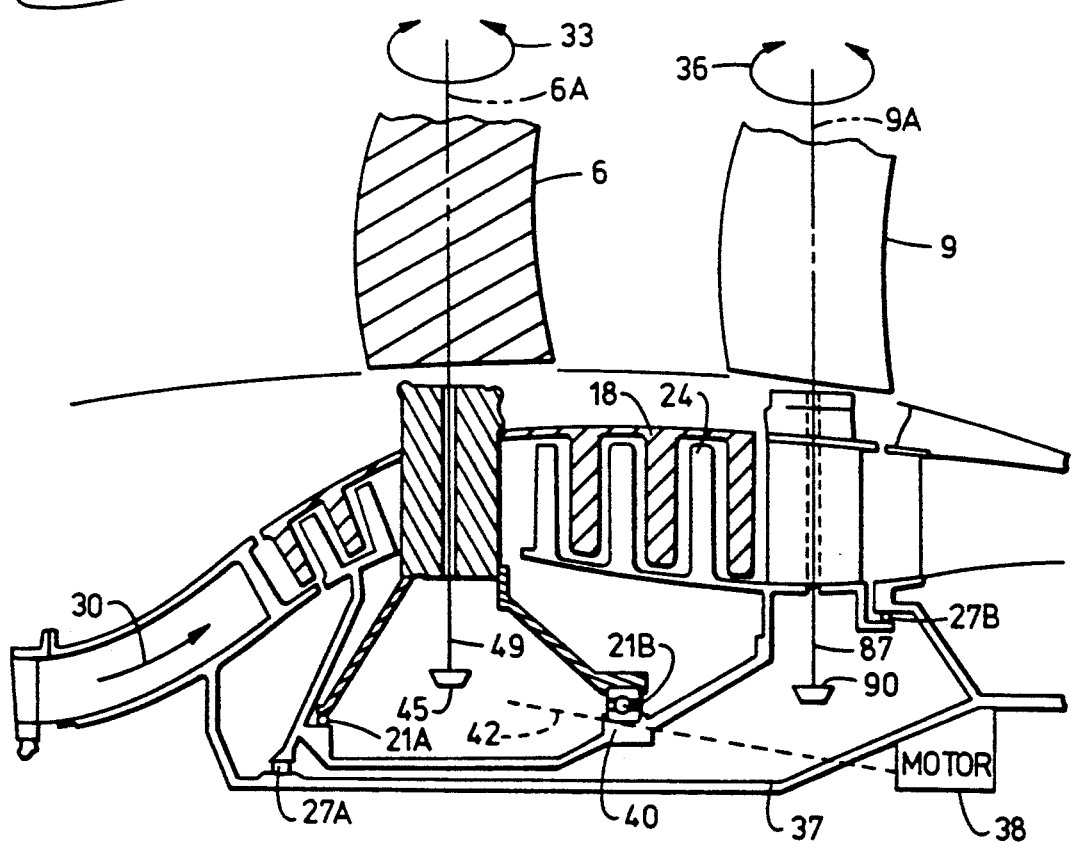
FIG. 2 illustrates, in simplified form, a type of turbine system which can drive the propellers shown in FIG. 1.
Figure 3:
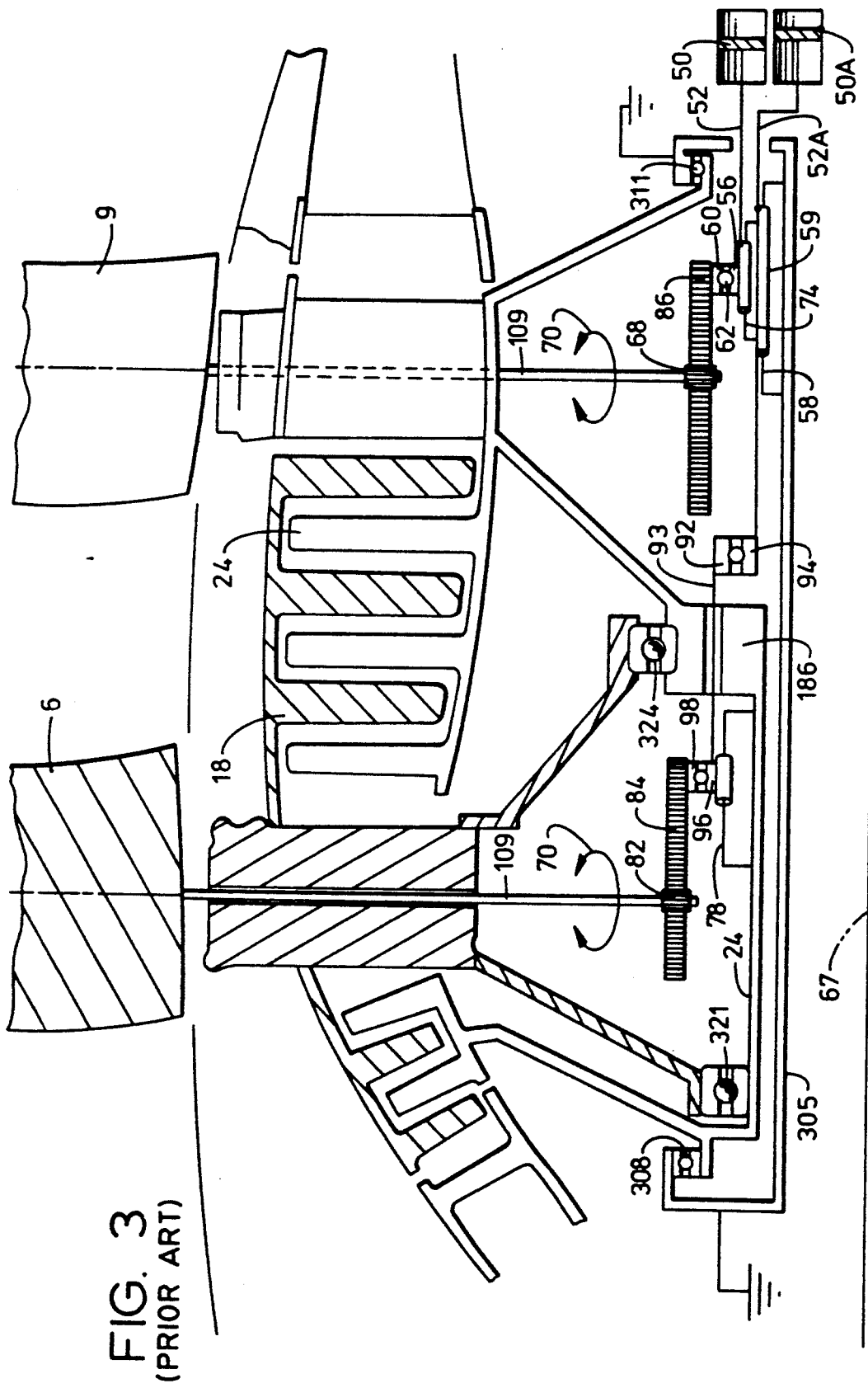
FIG. 3 illustrates a system in the prior art which can change pitch of the propellers in FIG. 2.

The use of the blade hub gear box 450 in FIG. 5 provides the advantage of the high gear ratio (approximately 25:1) which allows the use of a small diameter quill shaft 275, as pointed out above. Further, the overall system, including the blade hub gear boxes, has been found to be significantly stiffer than the prior art system of FIG. 3. For example, it has been found that a given torque on a propeller blade 6 in FIGS. 5 and 6 produces a deflection, measured in radians, which is about 30 percent of the deflection similarly measured in the system of FIG. 3. High stiffness is important for blade stability, proper functioning of the control system, and for reduced vibratory loading of the gear train.

Independent Pitch Adjustment

The invention allows the blade pitch of the forward blades 6 in FIG. 4 to be adjusted completely independently of that of the aft blades 9. This independence can be desirable because the aft blades 9 face different incoming air conditions than do the forward blades. For example, the forward blades 6 transmit a helically flowing airstream to the aft blades 9, which has a different incoming velocity and direction to the aft propeller than does the incoming air to the fore propeller. That is, the aft blades face different inlet conditions than do the forward blades. Therefore, the angle of attack of the air to the aft blades 9 differs from that for the fore blades 6. The differing angles of attack require different pitch angles.

Further, it is believed that an even greater difference in inlet conditions occurs during the transition from forward thrust to reverse thrust (during landing). During this transition, the forward propeller receives incoming air at Mach 0.2 or 0.3, while the aft propeller receives the same air, but after being pumped and swirled by the fore propeller. Experiment and calculation indicate that a substantial pitch difference can be required during thrust reversal.

Still further, in the case where the propellers are fluidically coupled, as in FIG. 4, their individual speeds can differ. Independent pitch change can be required to drive the propellers to the same speed, or to maintain a given speed difference.

Definitions

The drive gear 400 attached to motor 310 in FIG. 6 is stationary in the absence of pitch change. To coarsen pitch, the drive gear rotates in one direction. To make pitch more fine, the drive gear 400 rotates in the opposite direction. Thus, since the drive gear rotates in two opposite directions to achieve opposite pitch changes, the motion can be viewed as having an algebraic sign, namely, "positive" rotation and "negative" rotation.

From another point of view, because of the differential shown in FIG. 8, the pinions 200 and 365 rotate at speeds having a difference proportional to the speed of the drive gear 400. Further, as stated in the paragraph above, the speed difference has an algebraic sign: positive rotation of the drive gear causes pinion 200 to rotate faster (at speed S1) than pinion 365 (which rotates at speed S2), thus causing the difference in speeds (S1 minus S2) to have a positive algebraic sign. Similarly, negative rotation of the drive gear 400 causes speed S2 to exceed S1, thus causing the difference (S1 minus S2)

to be negative. Therefore, the algebraic sign of the speed difference between the two pinions 200 and 365 depends on the algebraic sign of the speed of the drive gear 400.

It is noted that ring gear 245 rotates opposite relative to ring gear 250, but at equal speed with respect to structure 241, as required to maintain engagement with common bevel gear 270. Further, both ring gears 245 and 250 move in opposite directions with respect to ring gear 253, and the sub-planets 240A-240C have gear ratios with the respective rings to allow the proper motion.

TECHNICAL CONSIDERATIONS

One explanation will be given for the relative rotation occurring between the following three pairs of ring gears in FIG. 6: ring gears 455 and 460, ring gears 245 and 250, and ring gears 250 and 253. This relative rotation can be explained by reference to FIGS. 12 through 14. Ring gears 250 and 253 are taken as illustrative.

Figure 12:
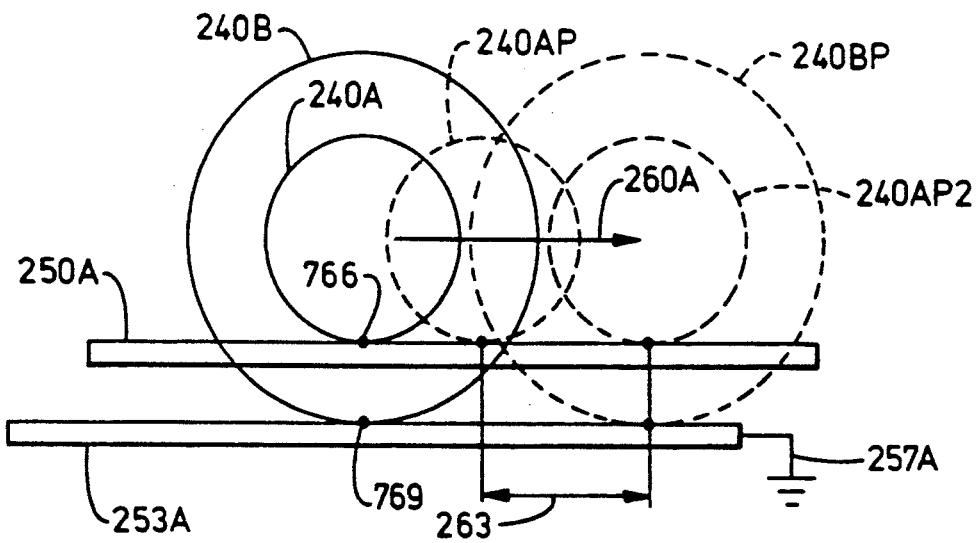
FIG. 12 illustrates a compound planet gear, of the type resembling planet 240 in FIGS. 5 and 7 and planet 450 in FIG. 5B.

In FIG. 12, ring gears 250 and 253 in FIG. 6 are shown as flat surfaces 250A and 253A. That is, in FIG. 12, the ring gears are shown as having infinite diameters. Compound planet 240 is indicated by two wheels 240A and 240B of different diameters. The different diameters indicate the different gear ratios between the sub-planets and their ring gears. Compound planet 240 rolls without slipping on surfaces 250A and 253A.

Surface 253A, is restrained against movement as indicated by ground symbol 257A, which corresponds in function to frame 241 in FIG. 6. If the compound planet gear 240 is drawn to the right as indicated by arrow 260A, for ¼ revolution, it rolls along both surfaces 250A and 253A. Sub planet 240A wishes to occupy phantom position 240AP, while sub-planet 240B wishes to occupy phantom position 240BP. However, since both sub-planets are locked together, sub-planet 240A is forced to move to position 240AP2, which drags surface 250A to the right by distance 263. Therefore, relative rotation occurs between surfaces 250A and 253A, and between the ring gears 250 and 253 which they represent.

This relative motion of the surfaces can be further explained with reference to FIG. 13, wherein tangent points 766 and 769 in FIG. 12 are shown and are viewed as pivot points at which a lever 772 is fastened to the surfaces 250A and 253A. If the lever 772 is pulled to the right, as indicated by force 775, surface 250A is driven to the right.

The preceding discussion has explained that motion of the compound gear 240 in FIG. 6 induces a relative rotation of ring gears 250 and 253. In addition, as will now be explained in connection with FIG. 14, a mechanical advantage can be obtained by force 775 in FIG. 13 over the ring gears.

Figure 13:
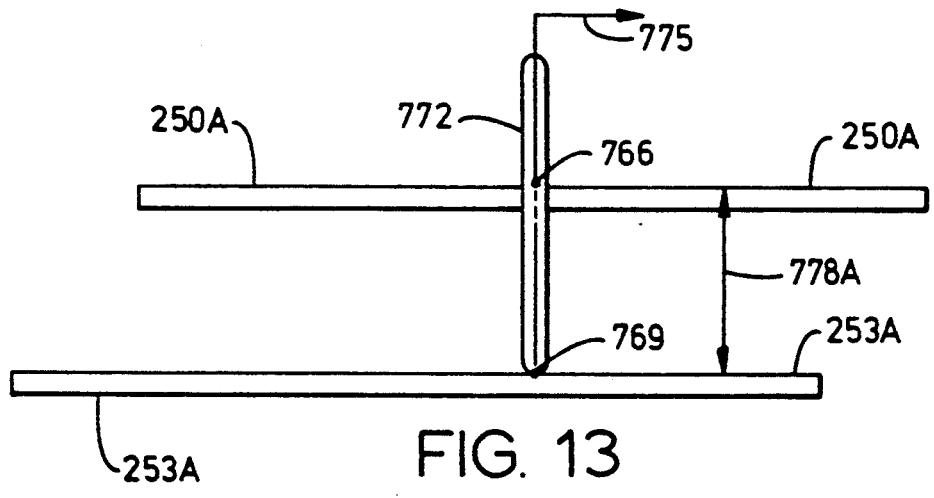
FIGS. 13 and 14 illustrate, using levers instead of gears, how rotation of the compound planet gear in FIG. 12 can cause relative movement between ring gears 250A and 253A.
Figure 14:
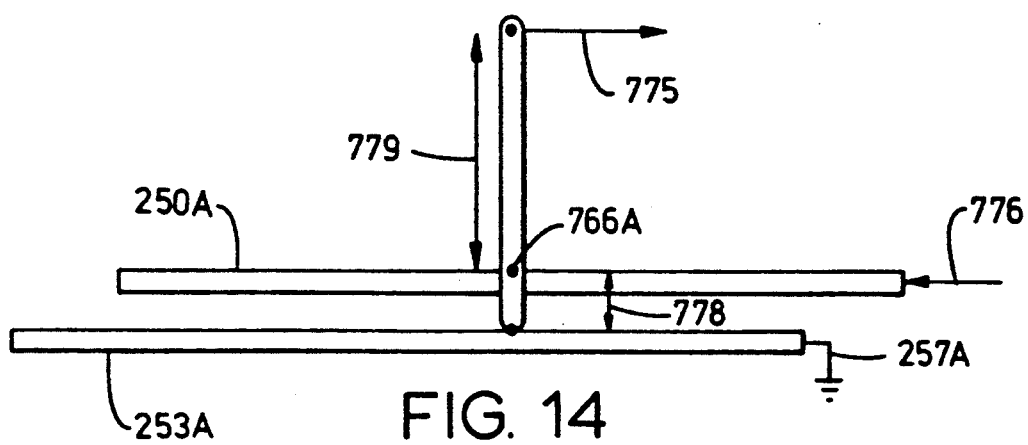
Figure 15:
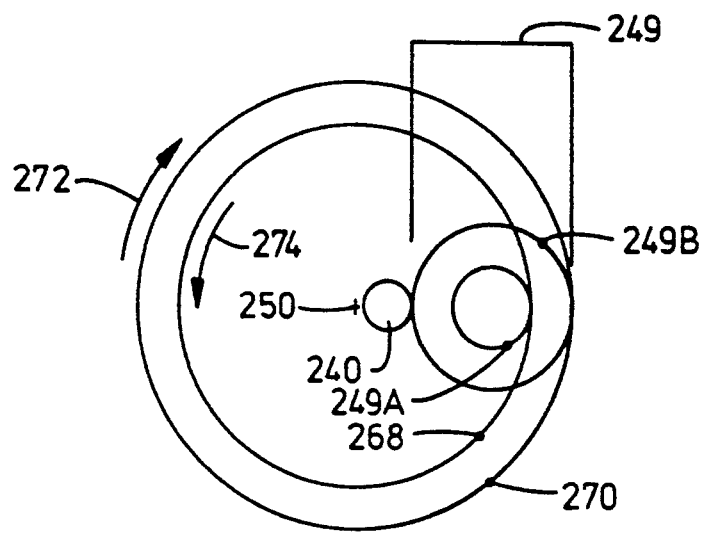
Figure 16:
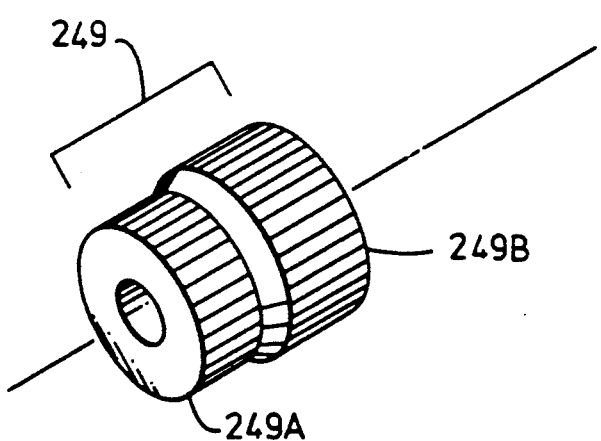

FIG. 14 shows a different separation 778 between the flat surfaces 250A and 253A, as compared with the separation 778A in FIG. 13. In FIG. 14, force 775 has a mechanical advantage over the resisting force 776 at point 766A. The numerical value of the advantage is the ratio of (distance 779 +distance 778)/(distance 778). Restated, the ratio shows that when distance 778 becomes smaller (ie, the closer are gears 240B and 240C to having the same diameter), the mechanical advantage of force 775 in FIG. 13 becomes larger.

The system just described (ie, two ring gears and a compound planet gear, in which the gear ratio between one sub-planet and one ring gear is different than that between the other sub-planet and its ring gear) is termed a "power hinge," or planetary differential, in the art.

Numerous substitutions and modifications can be undertaken without departing from the true spirit and scope of the invention as defined in the following claims. What is desired to be secured by Letters Patent is the invention as defined in the following claims.

We claim:

1. An aircraft propulsion system, comprising:
   a) an array of propeller blades of the variable-pitch type;
   b) pitch-change means for changing blade pitch, wherein said pitch-change means comprises,
      i) a plurality of reduction gear sets, each one associated with one of said propeller blades,
      ii) a pair of common ring gears driving all of said reduction gear sets,
      iii) a sun gear and a plurality of planet gears driving said pair of common ring gears, and a third ring gear which is fixed with respect to the propeller blades and is used to react an overturning moment on said planet gears, and
      iv) a driving means for driving said sun gear wherein said driving means includes a rotating shaft;
   c) unison brake means for overriding the pitch-change means and impeding excursions toward fine pitch, wherein said unison brake means comprises a mono-directional centrifugal brake which,
      i) is inoperative when said pitch-change means is driving said propeller blades toward coarse pitch,
      ii) applies a retarding drag to said sun gear when said pitch-change means is driving said propeller blades toward fine pitch,
      iii) maintains pitch in a constant position, by locking said sun gear to said fixed ring gear when said rotating shaft breaks,
      iv) includes a ratchet-like overrunning device, and
      v) does not interfere with the pitch-change operation in either direction for pitch adjustments within an engagement band of said ratchet-like overrunning device;
   d) feather brake means for overriding the pitch-change means and driving the blades toward coarse pitch; and
   e) pitch-limit means for limiting pitch attainable in both forward and reverse pitch modes.

2. An aircraft propulsion system, comprising:
   a) an annular carrier supporting a plurality of propeller blades;
   b) a ring gear driving a plurality of quill-shafts, one quill-shaft for each propeller blade;
   c) a torque multiplier connected between each quill-shaft and a respective propeller blade; and
   d) means for changing the speed of the ring gear relative to that of the annular carrier for changing blade pitch.

3. A pitch-change mechanism for an array of aircraft propeller blades carried by an annular carrier, comprising:
   a) a stationary hydraulic motor;
   b) a drive gear driven by the motor;
   c) differential means for driving two pinion gears at speeds having a difference which is proportional to the algebraic speed of the drive gear; and d) a gear train connecting the differential means with the propeller blades for changing blade pitch in accordance with the algebraic speed difference.

4. A propulsion system for an aircraft, comprising:
a) first and second counterrotating turbines;
b) a gas generator for providing a gas stream for driving both turbines;
c) first and second propellers of the pitch-changeable type driven by the respective first and second turbines;
d) first and second gear trains for changing pitch of the respective first and second propellers;
e) first feathering means for slowing rotation of the first propeller while the gas generator remains running; and
f) second feathering means for slowing rotation of the second propeller while the gas generator remains running.

5. A system according to claim 4 in which the first and second feathering means are operable independently of each other.

6. An aircraft propulsion system, comprising:
a) first and second annular carriers which
   i) are counterrotating and coaxial, and
   ii) carry respective first and second propeller blade arrays;
b) a first gear train connecting between a first motor, which is mounted to a stationary support, and the first array of propeller blades for changing pitch of the first array, wherein said first gear train comprises a planetary system which includes
   i) first and second bevel ring gears which drive shafts which change blade pitch,
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and
   iii) a sun gear which drives the compound planet gear and causes opposite relative rotation of the first and second bevel ring gears; and
c) a second gear train connecting between a second motor, which is mounted to a stationary support, and the second array of propeller blades for changing pitch of the second array, independent of the pitch of the first array.

7. An aircraft propulsion system, comprising:
a) first and second annular carriers which
   i) are counterrotating and coaxial, and
   ii) carry respective first and second propeller blade arrays;
b) a first gear train connecting between a first motor, which is mounted to a stationary support, and the first array of propeller blades for changing pitch of the first array, wherein said first gear train comprises a planetary system which includes
   i) first and second bevel ring gears which drive shafts which change blade pitch,
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and
   iii) a sun gear which drives the compound planet gear and causes opposite relative rotation of the first and second bevel ring gears; and
c) a second gear train connecting between a second motor, which is mounted to a stationary support, and the second array of propeller blades for changing pitch of the second array, independent of the pitch of the first array, wherein said second gear train comprises a planetary system which includes:
   i) first and second bevel ring gears which drive shafts which change blade pitch;
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and
   iii) a sun gear which drives the compound planet gear and causes opposite relative rotation of the first and second bevel ring gears.

8. An aircraft propulsion system, comprising:
a) first and second annular carriers which
   i) are counterrotating and coaxial, and
   ii) carry respective first and second propeller blade arrays;
b) a first gear train connecting between a first motor, which is mounted to a stationary support, and the first array of propeller blades for changing pitch of the first array, wherein said first gear train comprises a planetary system which includes
   i) first and second bevel ring gears which drive shafts which change blade pitch,
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and
   iii) a sun gear which drives the compound planet gear and causes opposite relative rotation of the first and second bevel ring gears; and
c) a second gear train connecting between a second motor, which is mounted to a stationary support, and the second array of propeller blades for changing pitch of the second array, independent of the pitch of the first array, wherein said second gear train comprises a planetary system which includes:
   i) first and second bevel ring gears which drive shafts which change blade pitch;
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and iii) a sun gear which drives the compound planet gear and causes opposite relative rotation of the first and second bevel ring gears; and d) wherein said first and second stationary motors independently drive the respective sun gears in the first and second gear trains.

9. An aircraft propulsion system, comprising:
a) first and second annular carriers which
   i) are counterrotating and coaxial, and
   ii) carry respective first and second propeller blade arrays;
b) a first gear train connecting between a first motor, which is mounted to a stationary support, and the first array of propeller blades for changing pitch of the first array, wherein said first gear train comprises a planetary system which includes
   i) first and second bevel ring gears which drive shafts which change blade pitch,
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and
   iii) a sun gear which drives the compound planet gear and causes opposite relative rotation of the first and second bevel ring gears;
c) a second gear train connecting between a second motor, which is mounted to a stationary support, and the second array of propeller blades for changing pitch of the second array, independent of the pitch of the first array, wherein said second gear train comprises a planetary system which includes:
   i) first and second bevel ring gears which drive shafts which change blade pitch;
   ii) first and second ring gears connected to the first and second bevel gears, and driven by a compound planet gear which
      A) engages the first and second ring gears at first and second, different, ratios, and
      B) engages a third ring gear which is synchronous with the first annular carrier, at a third ratio, different from the first and second ratios, and
   iii) a sun gear which drives the compound planet gear and causes opposite relative rotation of the first and second bevel ring gears; and
d) wherein said first and second stationary motors independently drive the respective sun gears in the first and second gear trains.
e) differential means in each gear train for allowing each motor to remain non-rotating when pitch-change is not occurring in the motor's respective propeller; and
f) wherein each gear train changes pitch of the respective array of propeller blades in a direction which depends upon the direction of rotation of the respective motor.

10. A system according to claim 9 and further comprising:
g) a first plurality of hub gear sets, each
   i) located near the blade root of a respective propeller blade in the first array; and
   ii) interconnected with the first gear train for amplifying torque provided by the first gear train; and
h) a second plurality of hub gear sets, each
   i) located near the blade root of a respective propeller blade in the second array; and
   ii) interconnected with the second gear train for amplifying torque provided by the second gear train.

11. An aircraft propulsion system, comprising:
a) a rotatable turbine having an annular flowpath;
b) an array of propeller blades mounted on an annular carrier surrounding the turbine;
c) a sun gear located radially inside the annular flowpath, and coaxial with, the turbine;
d) a radial array of shafts, all
   i) commonly driven by a drive means, which includes said sun gear, located radially inside the turbine flow path; and
   ii) extending through the turbine flowpath;
e) a plurality of reduction gears, each interconnected between one shaft and a respective propeller blade, for providing each shaft with a torque advantage over its blade; and
f) means for providing power to the drive means for changing blade pitch.

12. An aircraft propeller system having defined therein a pitch axis for each propeller blade and an axis of rotation for the propeller, comprising:
a) first and second ring gears (250, 253) which are coaxial with the axis of rotation (67);
b) a gear train connecting between the first and second ring gears and propeller blades (6), such that relative rotation between the first and second ring gears causes a change in pitch of the propeller blades;
c) a sun gear (220) coaxial with the axis of rotation (67);
d) a plurality of planet gears (240) engaging the first and second ring gears at different gear ratios, and engaging the sun gear;
e) a third ring gear (210) fastened to the sun gear;
f) a first stationary gear (200) driving the third ring gear;
g) a second stationary gear (365); and
h) differential means connecting between the first and second stationary gears for allowing positive and negative rotation of an input shaft (410) to respectively accelerate and decelerate the second stationary gear with respect to the first stationary gear.

13. A pitch-change mechanism for an array of aircraft propeller blades carried by an annular carrier, comprising:
a) a stationary hydraulic motor;
b) a sun gear driven by the motor;
c) first and second pinion gears;
d) differential means for
   i) driving the first pinion gear faster than the second pinion gear when the sun gear rotates in one direction; and
   i) driving the first pinion gear slower than the second pinion gear when the sun gear rotates in the opposite direction; and
e) a gear system including
   i) a first ring gear (360) which is synchronous with the annular carrier and which drives the second pinion gear at a fixed speed with respect to the annular carrier;
ii) a second ring gear (210) which is movable with respect to the annular carrier and which engages the first pinion gear;
iii) a sun gear (220) affixed to the second ring gear;
iv) a plurality of planet gears (240) driven by the sun gear;
v) a third ring gear (253) which is synchronous with the rotatable carrier and planet gears;
vi) a fourth ring gear (eg, 250) which is movable with respect to the annular carrier and engaging the planet gears at a gear ratio different than that between the third ring gear and the planet gears, such that rotation of the planet gears causes relative movement of the third and fourth ring gears;
vii) an annular bevel gear (eg, 265) affixed to the fourth ring gear; and
viii) a blade bevel gear (270) engaging the annular bevel gear and affixed to a shaft (275) which changes blade pitch when rotated.

14. An aircraft propulsion system, comprising:
a) first and second pinion gears;
b) an array of propeller blades carried by an annular carrier;
c) gear means connecting between the first and second pinion gears and the propeller blades such that, during normal operation:
   i) a speed difference between the first and second pinion gears is sufficient, by itself, to cause pitch change;
   ii) the magnitude of the speed difference controls the rate of the pitch change;
   iii) the algebraic sign of the speed difference controls the direction of pitch change; and
   iv) in the absence of pitch change, the first and second pinion gears rotate at equal speeds.

15. An aircraft propulsion system, comprising:
a) first and second pinion gears;
b) an array of propeller blades carried by an annular carrier;
c) gear means connecting between the first and second pinion gears and the propeller blades such that, during normal operation;
   i) a speed difference between the first and second pinion gears is sufficient, by itself, to cause pitch change;
   ii) the magnitude of the speed difference controls the rate of the pitch change;
   iii) the algebraic sign of the speed difference controls the direction of pitch change; and
   iv) in the absence of pitch change, the first and second pinion gears rotate at equal speeds; and
d) wherein said gear means comprises a planetary reduction gear system which includes:
   i) three ring gears which cooperate with a common planet gear, a first of the ring gears being synchronous with the annular carrier, and the second and third ring gears being driven in opposite relative directions by relative movement between the planet gear and the first ring gear; and
   ii) a bevel gear driven by the second and third ring gears and driving a shaft which causes pitch change when rotated.

16. An aircraft propulsion system, comprising:
a) first and second counterrotating propellers;
b) first and second gear trains for changing the respective pitches of the first and second propellers; and
c) unison brake means in each gear train which, when activated,
   i) impedes pitch change toward fine pitch and
   ii) presents no impediment to pitch change toward a coarser position; and
d) wherein each of said unison brake means comprises a mono-directional centrifugal brake.

* * * * *